United States Patent [19]
Chun et al.

[11] Patent Number: 5,351,334
[45] Date of Patent: Sep. 27, 1994

[54] ROTATION AND ALIGNMENT DEVICE FOR ASSEMBLING OF OPTICAL FIBER CONNECTOR WITH LOWER CONNECTION LOSS

[75] Inventors: Oh G. Chun; Seung H. Ahn; Myung Y. Jeong; Tae G. Choy, all of Daejeon, Rep. of Korea

[73] Assignees: Electronics and Telecommunications Research Institute, Daejeon; Korea Telecommunication Authority, Seoul, both of Rep. of Korea

[21] Appl. No.: 174,414

[22] Filed: Dec. 28, 1993

[30] Foreign Application Priority Data

Dec. 29, 1992 [KR] Rep. of Korea ............... 1992-26076

[51] Int. Cl.$^5$ .............................................. G02B 6/36
[52] U.S. Cl. ................................... 385/134; 385/60; 385/78; 385/85; 385/98; 29/468; 29/271
[58] Field of Search ............... 385/134, 135, 136, 137, 385/60, 78, 95, 96, 97, 98, 82, 85; 29/407, 464, 468, 271, 256, 520, 525, 721

[56] References Cited

U.S. PATENT DOCUMENTS

| | | | |
|---|---|---|---|
| 3,999,841 | 12/1976 | Dakss et al. | 385/85 X |
| 4,192,056 | 3/1980 | Logan et al. | 385/134 X |
| 4,678,271 | 7/1987 | Beaulieu | 385/134 |
| 5,113,474 | 5/1992 | Staney et al. | 385/82 X |

Primary Examiner—Rodney B. Bovernick
Assistant Examiner—Phan T. Heartney
Attorney, Agent, or Firm—Spencer, Frank & Schneider

[57] ABSTRACT

A rotation and alignment device for assembling of an optical fiber connector with a lower connection loss. This device image-processes the distribution of optical intensity of light emitted from an end surface of an optical fiber of a ferrule and derives an optical peak intensity point of the end surface of the optical fiber such that the point is placed in a predetermined region of a rectangular coordinate system. This device comprises a rotation and marking part for controlling a rotational position of a marker with respect to the ferrule and marking the optical peak intensity point on an outer surface of the ferrule. A ferrule fixture part is coupled to the rotation and marking part and fixes the ferrule such that the outer surface of the ferrule is marked with the optical peak intensity point by the marker. A vertical supporting part supports the rotation and marking part and the ferrule fixture pat. An optical system and fiber alignment part is mounted on the support rail part and magnifies and aligns the end surface of the optical fiber of the ferrule. The support rail part assures the rotation and marking part and the optical system and alignment part of a desired horizontal location.

5 Claims, 2 Drawing Sheets

ROTATION AND ALIGNMENT DEVICE FOR ASSEMBLING OF OPTICAL FIBER CONNECTOR WITH LOWER CONNECTION LOSS

BACKGROUND OF THE INVENTION

1. Field of the Invention

The present invention relates in general to device for assembling of an optical fiber connector connecting two optical fibers for using these fibers in optical communication and, more particularly, to a rotation and alignment device for assembling of an optical fiber connector connecting single-mode optical fibers with a lower connection loss.

2. Description of the Prior Art

Conventionally, in order to practically use optical fibers, for example, single-mode optical fibers, in an optical communication, these optical fibers should be precisely connected to each other using an optical fiber connector such that their centers are precisely aligned with each other. As well known to those skilled in the art, the optical fiber connection using an optical fiber connector is achieved by inserting and fixing the optical fibers in individual precise ferrules. These ferrules are in turn polished together with the end surfaces of their optical fibers such that the end surfaces of the fibers are perpendicular to the fiber axis. The ferrules having individual optical fibers are, thereafter, precisely aligned with each other by a precisely machined sleeve such that the ends of their optical fibers are precisely aligned with and connected to each other. Upon accomplishing the precise alignment and connection of the optical fibers by the optical fiber connector, these optical fibers can transmit optical signals therethrough in order to achieve the desired optical communication. Here, a desired connection between the two optical fibers of the same kind is achieved when it assures ideal continuity of optical waveguide medium, thus to achieve a perfect optical communication with no signal loss.

There will be no connection loss or no signal loss of the optical fiber connector when all the parts, such as the ferrules, the sleeve and the optical fibers, of the optical fiber connector are geometrically perfectly fabricated and assembled into the optical connector. However, the conventional optical fiber connector inevitably generates a connection loss or a signal loss at about the connecting portion of the optical fibers since the optical fiber connection using the connector practically introduces varieties of factors of incomplete connection.

The connection loss or the signal loss of the optical fiber connection using the conventional optical fiber connector are caused by optical fiber misalignments which are generally classified into two types, that is, extrinsic misalignments and intrinsic misalignments. Here, it is noted that improvement or reduction of the intrinsic misalignments of the optical fibers is very difficult such that it is scarcely achieved. In this regard, the recent approaches to development and production of optical fiber connectors showing a desired level of connection loss are concentrated to improvement or reduction of the extrinsic misalignments other than the intrinsic misalignments.

The extrinsic misalignments introduced in fiber connection using an optical fiber connector are generally classified into three types, that is, a gap misalignment between the facing ends of the two optical fibers, a lateral misalignment caused by the axial misalignment of the centers of the optical fibers and an angular misalignment caused by bending of the optical fibers. It is particularly noted that the connection loss introduced in the fiber connection of the single-mode optical fibers using the optical connector is mostly influenced by the lateral misalignment of the three extrinsic misalignments. This means that the development and production of an optical fiber connector showing the desired level of connection loss can be achieved by appropriate reduction of the three extrinsic misalignments, which trade off with each other, and, more particularly, by appropriate reduction of the lateral misalignment. Here, it should be noted that the endless approach to precision of all the parts of the optical fiber connector for reduction of the connection loss is attended with undesirable increase of cost of the optical fiber connector, thus to be insufficient in a competitive price and to cause a difficulty in production of the optical connector on a commercial scale.

In recent, there have been several proposals for optical connector assembling technique and for development of optical connector assembling system each of which provides an optical fiber connector showing a desirably lower connection loss when the parts of the optical fiber connector, produced with such appropriate precision that no serious increase of cost is caused, are assembled into the optical fiber connector connecting the optical fibers to each other. Particularly, it is noted that a SC-type optical fiber connector results in a good effect of reduction of the connection loss by appropriate rotational adjustment of the centers of the optical fibers, which are connected to each other together with their ferrules in the sleeve, instead of fixing the centers of the optical fibers at a given alignment position.

In the optical fiber connection using the SC-type optical connector, two ferrules previously coupled to individual optical fibers are used. That is, a light beam of a light source is received by an end of an optical fiber of a stationary ferrule while a corresponding end of an optical fiber of the other ferrule or a movable ferrule is provided with an optical powermeter. In this fiber connection, the movable ferrule is rotated with respect to the stationary ferrule until the optical powermeter detects the most intensive optical power. Here, the lateral misalignment of the optical fibers of the ferrules in the sleeve is most reduced when the optical powermeter detects the most intensive optical power.

However, the desired reduction of lateral misalignment of the optical fibers in the optical fiber connection using the SC-type optical connector is achieved not by direct finding and alignment of the centers of the optical fibers in the sleeve but by rotational adjustment of the movable ferrule with respect to the stationary ferrule in order to indirectly align the centers of the optical fibers in a predetermined alignment region using change of the optical power transmission effect. Hence, the above optical fiber connection using the SC-type optical connector has a problem that it is required to rotate several times the movable ferrule with respect to the stationary ferrule in order to detect the most intensive optical power and to align the centers of the optical fibers in the predetermined alignment region. Another problem of the optical fiber connection using the SC-type optical connector is resided in that it requires much time in order to achieve the desired alignment of the centers of the optical fibers particularly when the predetermined alignment region is defined to be such narrower that optimal reduction of the connection loss can be achieved. Hence, this optical fiber connection using the SC-type connector still causes a difficulty in minimization of the connection loss.

SUMMARY OF THE INVENTION

It is, therefore, an object of the present invention to provide a rotation and alignment device for assembling of an optical fiber connector with a lower connection loss in which the aforementioned problems can be overcome and which image-processes the distribution of optical intensity of light emitted from an optical fiber fixedly coupled to an inner hole of a ferrule and derives an optical peak intensity point of a light emission circular surface of the optical fiber such that the optical peak intensity point is placed in a predetermined region of a preset rectangular coordinate system.

In order to accomplish the above object, a rotation and alignment device for assembling of an optical fiber connector with a lower connection loss in accordance with an embodiment of the present invention comprises a rotation and marking part for controlling a rotational position of a marker with respect to a ferrule and marking an optical peak intensity point on an outer surface of the ferrule; a ferrule fixture part coupled to the rotation and marking part, the ferrule fixture part fixing the ferrule such that the cylindrical outer surface of the ferrule is marked with the optical peak intensity point by the marker; a vertical supporting part erected on a support rail part and supporting the rotation and marking part and the ferrule fixture part; an optical system and fiber alignment part mounted on the support rail part and magnifying and aligning an end surface of an optical fiber connected to the ferrule; and the support rail part assuring the rotation and marking part and the optical system and alignment part of a desired horizontal location.

BRIEF DESCRIPTION OF THE DRAWINGS

The above and other objects, features and other advantages of the present invention will be more clearly understood from the following detailed description taken in conjunction with the accompanying drawings, in which:

FIGS. 2A and 2B are views showing a construction of a ferrule fixture part of the device of FIG. 1, respectively, in which:

FIG. 2A shows the fixture part before fixing the ferrule to a vertical support part; and FIG. 2B shows the fixture part after fixing the ferrule to the vertical support part;

DESCRIPTION OF THE PREFERRED EMBODIMENTS

Figure 1:
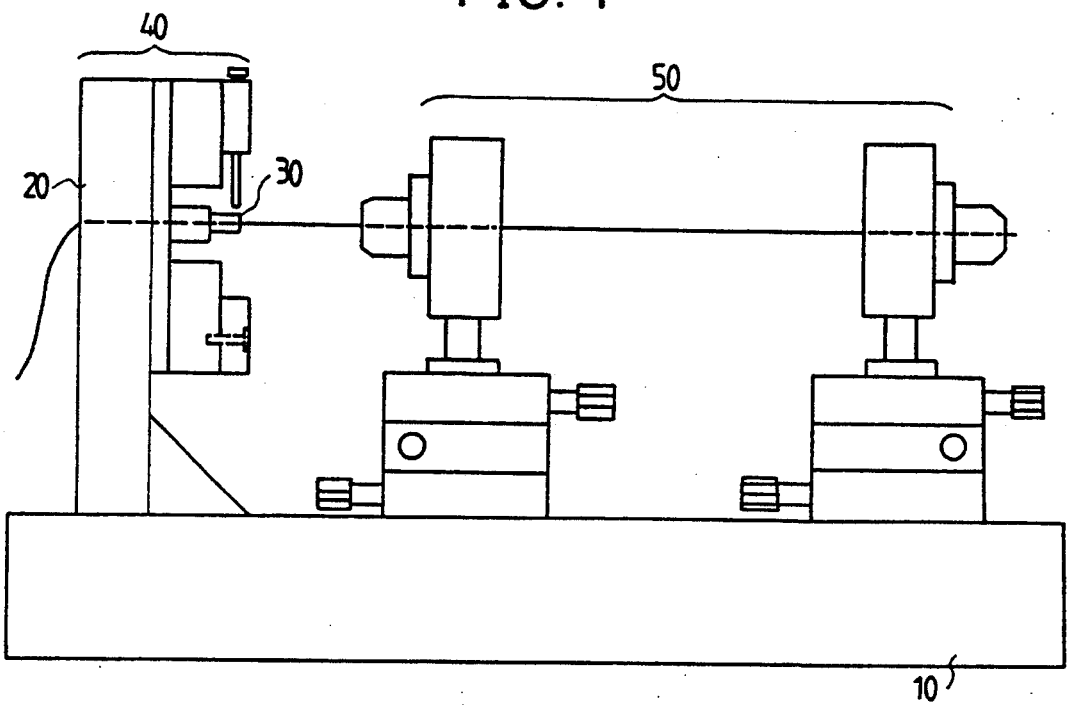
FIG. 1 is a front view of a rotation and alignment device for assembling of an optical fiber connector with a lower connection loss in accordance with an embodiment of the present invention.

The technical background of the present invention will be given prior to description of the preferred embodiments of the present invention.

As disclosed in document of CCITT G.652, the mode field concentricity error of a single-mode optical fiber cable should not exceed 1 μm. That is, each single-mode optical fiber should have a geometrical structure in which there may a difference between a geometrical center of the fiber and a mode field center of the fiber, however, this difference between the centers should not exceed 1 μm. In addition, lateral misalignment causing errors, such as concentricity error between inner and outer diameters of the ferrule supporting and fixing its optical fiber and clearance between the optical fiber and the inner diameter of the ferrule, are regarded as important factors causing the fiber connection loss of the optical fiber connector since these errors probably mixed in practical connection of the fibers and amplifies the lateral misalignment of the fibers. However, when the optical peak intensity points of the optical fibers of the ferrules can be collected in a predetermined region of a rectangular coordinate system by rotational adjustment of the ferrules having the optical fibers, the influence by the above lateral misalignment causing errors can be minimized.

In order for rotational adjustment of the ferrules having the optical fibers by collection or derivation of the optical peak intensity points of the fibers in the predetermined region of the rectangular coordinate system, the center axis and diametrical axis of the ferrule should be set as the X- and Y-axes of the rectangular coordinate system, a rotational angle between the coordinate system and the optical peak intensity point of the optical fiber should be calculated, an automatic rotational adjustment of the ferrule having the optical fiber at the derivative rotational angle should be carried out, and the cylindrical outer surface of the ferrule should be marked with the optical peak intensity point at the rotationally adjusted position. In accordance, the present invention produces a polarized optical connector due to the marking of the ferrule.

In accordance with the present invention, when two optional ferrules which are rotationally adjusted as described above are connected to each other by an adapter, the optical peak intensity points of the optical fibers, through which fibers the optical signals are transmitted for optical communication, are coupled to each other in the predetermined region of the coordinate system, thus to desirably reduce the connection loss of the optical fiber connector.

The rotational adjustment of the optical peak intensity point of the optical fiber at the derivative rotational angle in the light emission circular surface of the optical fiber is preferably carried out in accordance with the following two methods.

First, a ferrule is rotated together with a rotational stage at the derivative rotational angle and, at that rotated position, the outer surface of the ferrule is marked with the optical peak intensity point by a fixed marker. This method is referred to simply as the adjustment method of the ferrule rotating type.

Second, a movable marker is rotated at the derivative rotational angle and marks the optical intensity point on the outer surface of a fixed ferrule. This method is referred to simply as the adjustment method of the ferrule fixing type.

In the above adjustment method of the ferrule rotating type, it is very difficult to achieve a sub-micron alignment due to overlapping of the concentricity errors of the parts of the rotation and alignment device of this invention. That is, the errors in alignment of the parts of the rotation and alignment device of this invention should be limited to about 0.1-0.21 μm in order to limit the total error of the rotation and alignment device not to exceed 1 μm. In order to achieve the above object, all the parts of the rotation and alignment device of this invention requires a mechanical precision such that they should be machined and managed under the condition of constant temperature and constant humidity.

In this regard, it is preferred to use the adjustment method of the ferrule fixing type other than the adjustment method of the ferrule rotating type in the rotational adjustment of the optical fibers. That is, the movable marker is rotated at the derivative rotational angle of the optical peak intensity point and marks the optical peak intensity point on the cylindrical outer surface of the ferrule fixed on a ferrule fixture part of the rotation and adjustment device. The error generated in this adjustment method of the ferrule fixing type is very small such that it is occasionally negligible when it is compared with the circumference of the ferrule. Otherwise stated, the influence by the error of the adjustment method of the ferrule fixing type is effective only when the derivative rotational angle is less than 1°-2°. The rotation and alignment device of the present invention is provided with a computer which carries out an image processing of mode field optical intensity distribution in the end surface of the ferrule and directly controls the rotation and alignment part of the device, thus to automate the assembling process for the optical fiber connector.

Hereinbelow, preferred embodiments of the present invention will be described in conjunction with the accompanying drawings.

Figure 2A:
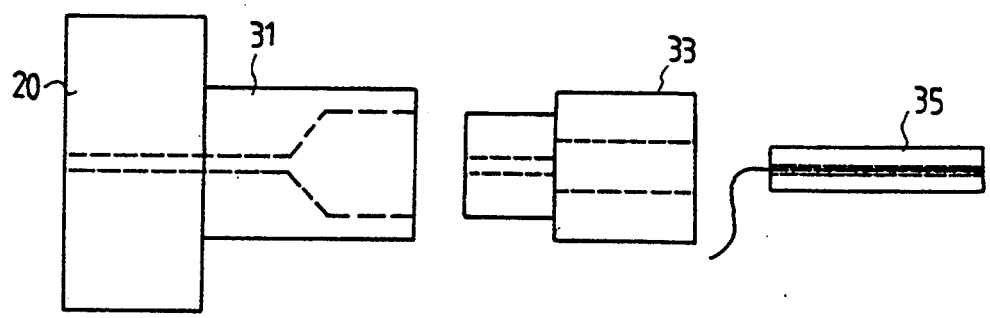
Figure 2B:
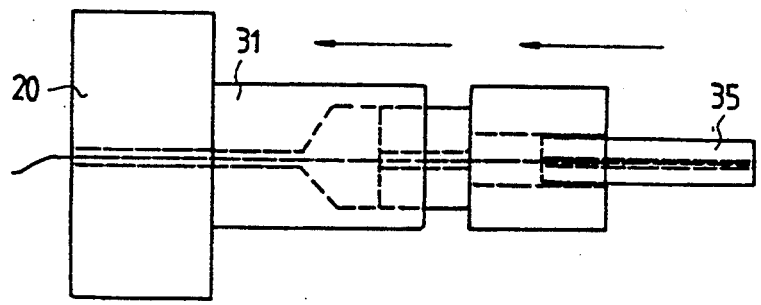
Figure 3:
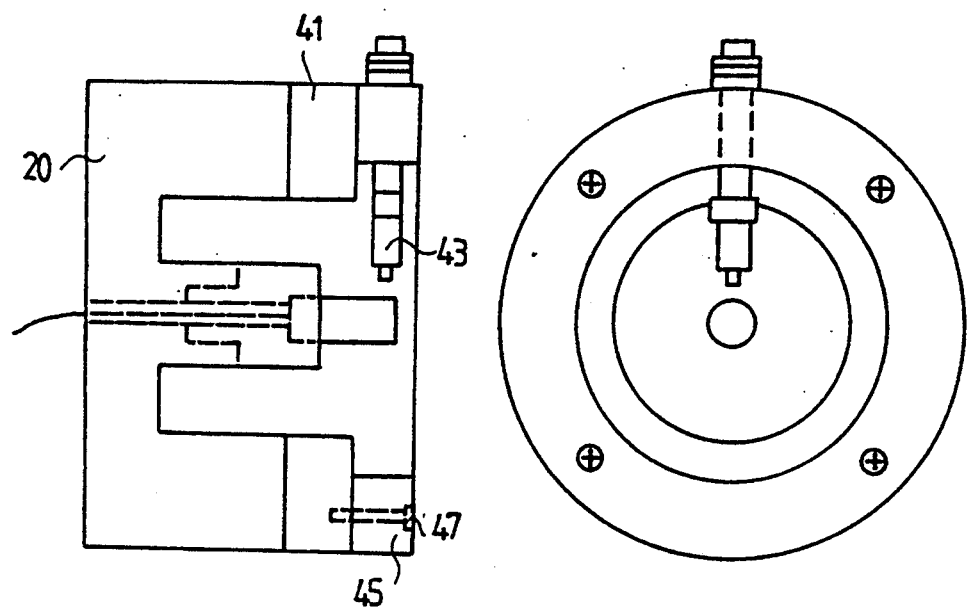
FIG. 3 is a view showing in front and plane views a construction of a rotation and marking part of the device of FIG. 1.
Figure 4:
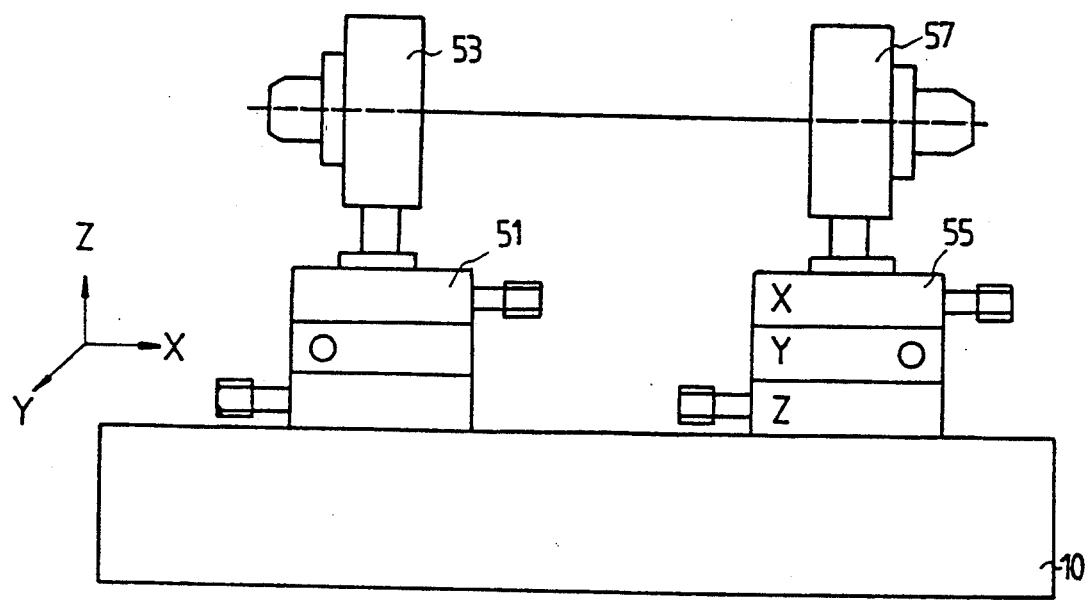
FIG. 4 is a front view showing a construction of an optical system and fiber alignment part of the device of FIG. 1.

FIG. 1 is a front view showing a rotation and alignment device for assembling of an optical fiber connector with a lower connection loss in accordance with an embodiment of the present invention. FIGS. 2A and 2B are views showing a construction of a ferrule fixture part 30 of the device of FIG. 1. FIG. 3 is a view showing a construction of a rotation and marking part 40 of the device of FIG. 1. FIG. 4 is a front view showing a construction of an optical system and fiber alignment part 50 of the device of FIG. 1.

Referring first to FIG. 1, the rotation and alignment device of this invention comprises the rotation and marking part 40 which controls the rotational position of a marker 43 with respect to a fixed ferrule 35 and marks an optical peak intensity point on an outer surface of the ferrule 35. The ferrule fixture part 30 is coupled to the rotation and marking part 40 for fixing the ferrule 35 such that the cylindrical outer surface of the ferrule 35 is marked with the optical peak intensity point by the marker 43. A vertical supporting part 20 is erected on an upper side of a support rail part 10 in order to support the rotation and marking part 40 as well as the ferrule fixture part 30. The rotation and alignment device further includes the optical system and fiber alignment part 50 which is mounted on the support rail part 10 and magnifies and aligns the light emission surface of the optical fiber combined with the ferrule 35. The base or the support rail part 10 assures the rotation and marking part 40 and the optical system and alignment part 50 of a desired horizontal location.

In the above rotation and alignment device, the distribution of optical intensity of light emitted from the optical fiber fixedly coupled to an inner hole of the fixed ferrule 35 is image-processed by the optical system and an IR camera. The marker 43 is controlled in its rotational position in accordance with the information of the image-processed distribution of the optical intensity and, thereafter, the optical peak intensity point is marked on the cylindrical outer surface of the ferrule 35 by the marker 43.

Turning to FIGS. 2A and 2B showing the ferrule fixture part 30 in the state before fixing the ferrule 35 to the vertical supporting part 20 and after fixing the ferrule 35 to the part 20, respectively, this fixture part 30 comprises the ferrule 35 having the optical fiber. The fixture part 30 also comprises a ferrule adapter 33 for connecting the ferrule 35 to an adapter fixing member 31. This member 31 in turn fixes the adapter 33 to the rotation and marking part 40. The ferrule fixture part 30 is fixed to the rotation and marking part 40 for fixing the ferrule 35 such that the cylindrical outer surface of the fixed ferrule 35 is marked with the optical peak intensity point by the rotatable marker 43. This ferrule fixture part 30 provides an advantage that it allows the ferrule adapter 33 to have varieties of sizes of its inner hole, thus to assure the adapter 33 of wide interchangeability for receiving varieties of outer diameters of ferrules 35.

In accordance with the preferred embodiment of the present invention, the ferrule adapter 33 is coupled to the adapter fixing member 31 by a snap-on coupling structure for achieving the tight and detachably coupling of the adapter 33 to the fixing member 31 in a limited space. In addition, the ferrule adapter 33 and the ferrule 35 are such constructed that the inner diameter of the adapter 33 is larger than the outer diameter of the ferrule 35 while the difference between those diameters is limited as small as possible. That is, the difference between the inner diameter of the adapter 33 and the outer diameter of the ferrule 35 is preferably not more than 1 μm, so that the ferrule 35 is tightly fixed to the adapter 33 with no additional fixture. Thanking for the above structure of the ferrule fixture part 30, a conventional strong force is not required in fixing the ferrule 35, so that the concentricity error generated in rotation is remarkably reduced.

In order to fix the ferrule 35 to the rotation and alignment device of this invention, the ferrule 35 having the optical fiber is coupled to the ferrule adapter 33. In the coupling of the ferrule 35 to the ferrule adapter 33, the optical fiber of the ferrule 35 first passes through the inner through hole of the adapter 33 and, thereafter, a coupling section of the ferrule 35 is inserted into a ferrule receiving cavity of the adapter 33. The ferrule adapter 33 is, thereafter, coupled to the adapter fixing member 31 which is in turn fixed to the vertical supporting part 20. Hence, the optical fiber of the ferrule 35 passes through the inner holes of the ferrule adapter 33, the adapter fixing member 31 and the vertical supporting part 20 in series as shown in FIG. 2B and, thereafter, connected to a light source (not shown). In this state, the optical intensity of the light emission surface of the optical fiber is measured.

Referring next to FIG. 3 showing the construction of the rotation and marking part 40, this part 40 comprises an annular rotatable stage 41 and the marker 43 radially supported on the rotatable stage 41. The rotatable stage 41 is rotated by the rotational force of a stepping motor (not shown) and electrically connected to a computer through IEEE-488. The computer controls the rotational angle of the rotating stage 41 such that the rotating position of the stage 41 is precisely controlled with an error less than 1°. The marker 43 is radially fixedly supported on the rotatable stage 41 through a marker support annular plate 45. This plate 45 is fixed to the rotatable stage 41 by a plurality of screws 47 such that it is rotated together with the rotatable stage 41. The marking of the optical peak intensity point on the cylindrical outer surface of the ferrule 35 by the marker 43 is carried out after the controlled rotation of the rotating stage 41 is finished. At this time, the rotation of the marker 43 to a desired marking position is achieved by the controlled rotation of the rotating stage 41.

As shown in FIG. 4, the optical system and fiber alignment part 50 comprises an objective lens system 53 and an eye lens system 57. This part 50 also comprises a first precise movement controller 51 for precisely moving the objective lens system 53 in X, Y and Z directions in the three-dimensional rectangular coordinate system and a second precise movement controller 55 for precisely moving the eye lens system 57 in X, Y and Z directions in the three-dimensional rectangular coordinate system.

This optical system and fiber alignment part 50 is adapted for prevention of generation of larger calculation error in derivation of the optical peak intensity point in consideration of the small-sized diameter of about 10 $\mu$m of the light emission surface of the optical fiber showing the optical intensity. In order to achieve the above object, the distribution of the optical intensity of the optical fiber is magnified by the two lens systems 53 and 57 and the magnified image of the distribution of the optical intensity precisely coincides with the focus of the IR camera by the two controllers 51 and 55.

As described above, the rotation and alignment device of the present invention optimally improves or reduces the connection loss of an optical fiber connector, which comprises a ferrule, a sleeve and a ferrule adapter, without increasing the mechanical precision of the above parts of the optical connector. Particularly, the present invention uses the distribution of optical intensity of the end surface of the optical fiber in order for reduction of the connection loss of the optical connector, so that the present invention is wide adapted to connection of optical fibers regardless of mode field concentricity error of the optical fibers. The rotation and alignment device of this invention is also interfaced to a computer, thus to remarkably reduce the assembling time.

In accordance with the reduction of the connection loss by the present invention, a good transmission effect of the optical cable transmission system necessarily requiring the optical fiber connection using the optical connector is achieved. Another advantage of the present invention is resided in that this invention remarkably reduces the time requiring for provision of an optical fiber connector having ideal connection loss.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A rotation and alignment device for assembling of an optical fiber connector with a lower connection loss comprising:

rotation and marking means for controlling a rotational position of a marker with respect to a ferrule and marking an optical peak intensity point on a cylindrical outer surface of said ferrule;

ferrule fixing means coupled to said rotation and marking means, said ferrule fixing means fixing said ferrule such that said cylindrical outer surface of the ferrule is marked with said optical peak intensity point by said marker;

vertical supporting means erected on support rail means for supporting said rotation and marking means and said ferrule fixing means;

optical system and fiber alignment means mounted on said support rail means for magnifying and aligning an end surface of an optical fiber of said ferrule; and said support rail means for assuring said rotation and marking means and said optical system and alignment means of a desired horizontal location.

2. The rotation and alignment device according to claim 1, wherein said ferrule fixing means comprises; a ferrule adapter for fixing said ferrule having said optical fiber; and an adapter fixing member connecting said ferrule adapter to said rotation and marking means.

3. The rotation and alignment device according to claim 2, wherein said ferrule adapter is such constructed that its inner diameter is larger than an outer diameter of said ferrule while the difference between its inner diameter and the outer diameter of said ferrule is not more than 1 $\mu$m.

4. The rotation and alignment device according to claim 1, wherein said rotation and marking means comprises:

a rotatable stage rotated by an outside rotational force;

a marker support plate mounted on said rotatable stage by a plurality of screws such that it is rotated together with said rotatable stage;

said marker mounted on said marker support plate.

5. The rotation and alignment device according to claim 1, wherein said optical system and fiber alignment means comprises:

an objective lens system and an eye lens system, both magnifying said end surface of said optical fiber; and first and second precise movement controllers, said first controller precisely moving said objective lens system in X, Y and Z directions of a three-dimensional rectangular coordinate system and said second controller precisely moving said eye lens system in the X, Y and Z directions of said three-dimensional rectangular coordinate system.

* * * * *